(12) United States Patent
Tashiro et al.

(10) Patent No.: US 7,571,784 B2
(45) Date of Patent: Aug. 11, 2009

(54) FLEXIBLE COUPLING AND IN-WHEEL MOTOR SYSTEM

(75) Inventors: Katsumi Tashiro, Kodaira (JP); Satoru Kawamata, Kodaira (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 140 days.

(21) Appl. No.: 11/662,624

(22) PCT Filed: Sep. 9, 2005

(86) PCT No.: PCT/JP2005/016660

§ 371 (c)(1),
(2), (4) Date: Mar. 13, 2007

(87) PCT Pub. No.: WO2006/030715

PCT Pub. Date: Mar. 23, 2006

(65) Prior Publication Data

US 2008/0000706 A1    Jan. 3, 2008

(30) Foreign Application Priority Data

Sep. 14, 2004  (JP) .............................. 2004-266907

(51) Int. Cl.
*B60K 1/00* (2006.01)
(52) U.S. Cl. ..................................... 180/65.51; 301/6.5
(58) Field of Classification Search ................ 180/65.5, 180/65.6, 65.3, 205, 220, 90, 65.51, 901; 310/67 R, 154.05, 255, 268, 179; 192/3.29, 192/213.11, 70.13, 105 C; 301/6.5
See application file for complete search history.

(56) References Cited

U.S. PATENT DOCUMENTS 2,090,265 A * 8/1937 Padgett ..................... 192/70.13
3,566,165 A * 2/1971 Lohr ......................... 310/67 R (Continued)

FOREIGN PATENT DOCUMENTS

JP          49-1323 B1     1/1974

(Continued)

OTHER PUBLICATIONS

Microfilm of the specification and drawings annexed to the request of Japanese Utility Model Application No. 20653/1982 (Laid-open No. 122701/1983) (Sanden Corp.), Aug. 20, 1883, Full text; all drawings (Family: none).

(Continued)

*Primary Examiner*—Hau V Phan
(74) *Attorney, Agent, or Firm*—Sughrue Mion, PLLC (57) ABSTRACT

A flexible coupling 10 is constituted such that a drive-side plate 11 and an intermediate plate 13 are interconnected by first connection members 14A to 14D having a rubber member in such a manner that they can move in a direction perpendicular to a direction for interconnecting pin members 15a and 15b for mounting the above first connection members 14A to 14B, and the intermediate plate 13 and a driven-side plate 12 are interconnected by second connection members 16A to 16D having the same constitution as the above first connection members 14A to 14D and arranged perpendicular to the above first connection members 14A to 14D in such a manner that they can move in a direction perpendicular to the above direction. Torque on the drive side can be transmitted to the driven side efficiently with simple constitution and the flexible coupling can be easily mounted.

14 Claims, 7 Drawing Sheets

U.S. PATENT DOCUMENTS

| | | | |
|---|---|---|---|
| 5,014,800 A * | 5/1991 | Kawamoto et al. | 180/65.5 |
| 5,322,141 A * | 6/1994 | Brunner et al. | 180/65.5 |
| 5,450,915 A * | 9/1995 | Li | 180/65.5 |
| 5,581,136 A * | 12/1996 | Li | 310/67 R |
| 5,598,745 A * | 2/1997 | Tsuchiya | 192/213.11 |
| 5,662,187 A * | 9/1997 | Mc Govern | 180/205 |
| 6,286,648 B1 * | 9/2001 | Matsuoka | 192/3.29 |
| 6,664,692 B1 * | 12/2003 | Kristoffersen | 310/179 |
| 6,765,327 B2 * | 7/2004 | Hashimoto et al. | 310/90 |
| 7,121,367 B2 * | 10/2006 | Ajiro et al. | 180/65.5 |

FOREIGN PATENT DOCUMENTS

| | | |
|---|---|---|
| JP | 49-78050 A | 7/1974 |
| JP | 5-99241 A | 4/1993 |
| JP | 2004-161189 A | 6/2004 |

OTHER PUBLICATIONS

CD-Rom of the specification and drawings annexed to the request of Japanese Utility Model Application No. 5004/1992 (Laid-open No. 57451/1993) (Chuo Hatsujo Kabushiki Kaisha), Jul. 30, 1993, Full text; all drawings (Family: none).

* cited by examiner

$X \ll L$
$\Delta L \fallingdotseq \dfrac{X^2}{2L}$

FIG. 9 PRIOR ART

FLEXIBLE COUPLING AND IN-WHEEL MOTOR SYSTEM

BACKGROUND OF THE INVENTION

1. Field of the Invention

The present invention relates to the transmission mechanism of torque and, specifically, to a flexible coupling capable of transmitting torque on a drive side smoothly and efficiently even when eccentricity occurs between the drive side and the driven side and an in-wheel motor system comprising this flexible coupling.

2. Description of the Prior Art

Figure 7:
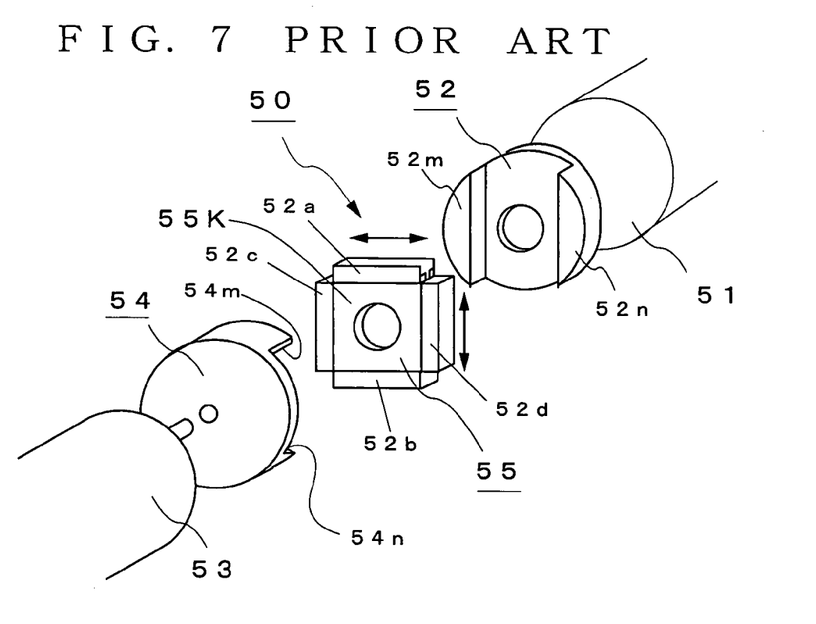
FIG. 7 is a diagram showing the constitution of a coupling of the prior art.

In a torque transmission mechanism, a rotary shaft on a drive side such as a motor and a rotary shaft on a driven side such as an impeller or a ball screw are generally connected to each other by a joint. However, it is difficult to align the drive shaft with the driven shaft in an axial direction, and a coupling 50 which is an improved version of Oldham's joint which can move in the direction of eccentricity or declination or a sliding direction as shown in FIG. 7 is used (refer to patent document 1, for example) when eccentricity or declination tends to occur between these rotary shafts. This coupling 50 comprises a hollow cylinder-like drive shaft member 52 mounted to the end of a drive shaft 51, a hollow cylinder-like driven shaft member 54 which is mounted to the end of a driven shaft 53, and a torque transmitting member 55 interposed between the above drive shaft member 52 and the driven shaft member 54. A pair of first guide members 52m and 52n made of metal are provided at the end on the driven side of the above drive shaft member 52, a pair of second guide members 54m and 54n made of metal and perpendicular to the first guide members 52m and 52n are provided at the end on the drive side of the above driven shaft member 54, first slide members 55c and 55d made of plastic are provided at the periphery of the support body 55K of the above torque transmitting member 55 in such a manner that they can slide over the inner surfaces of the above second guide members 54m and 54n, and second slide members 55a and 55b made of plastic are provided at the periphery of the support body 55K in such a manner that they can slide over the above first guide members 52m and 52n so that the above drive shaft member 52 and the above driven shaft member 54 are connected to each other in such a manner that they can move linearly in vertical and horizontal directions. Therefore, even when eccentricity or declination occurs between the drive shaft 51 and the driven shaft 53, torque can be transmitted without fail.

Figure 8:
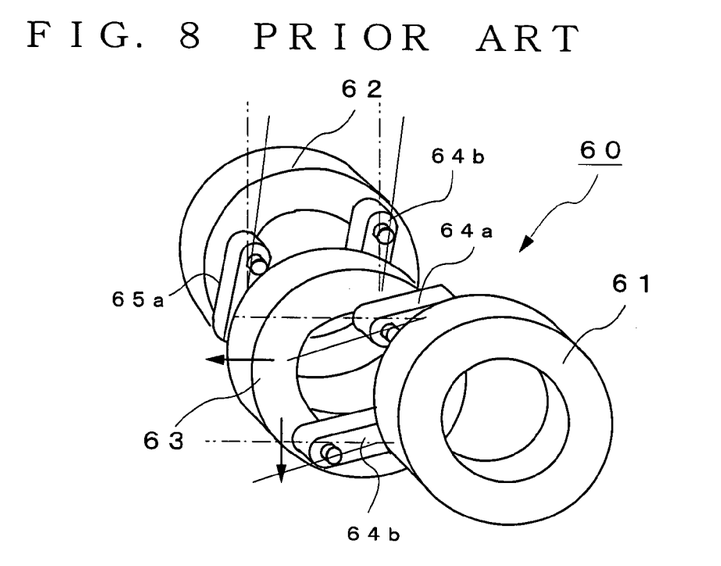
FIG. 8 is a diagram showing the constitution of a Schmidt coupling of the prior art.
Figure 9:
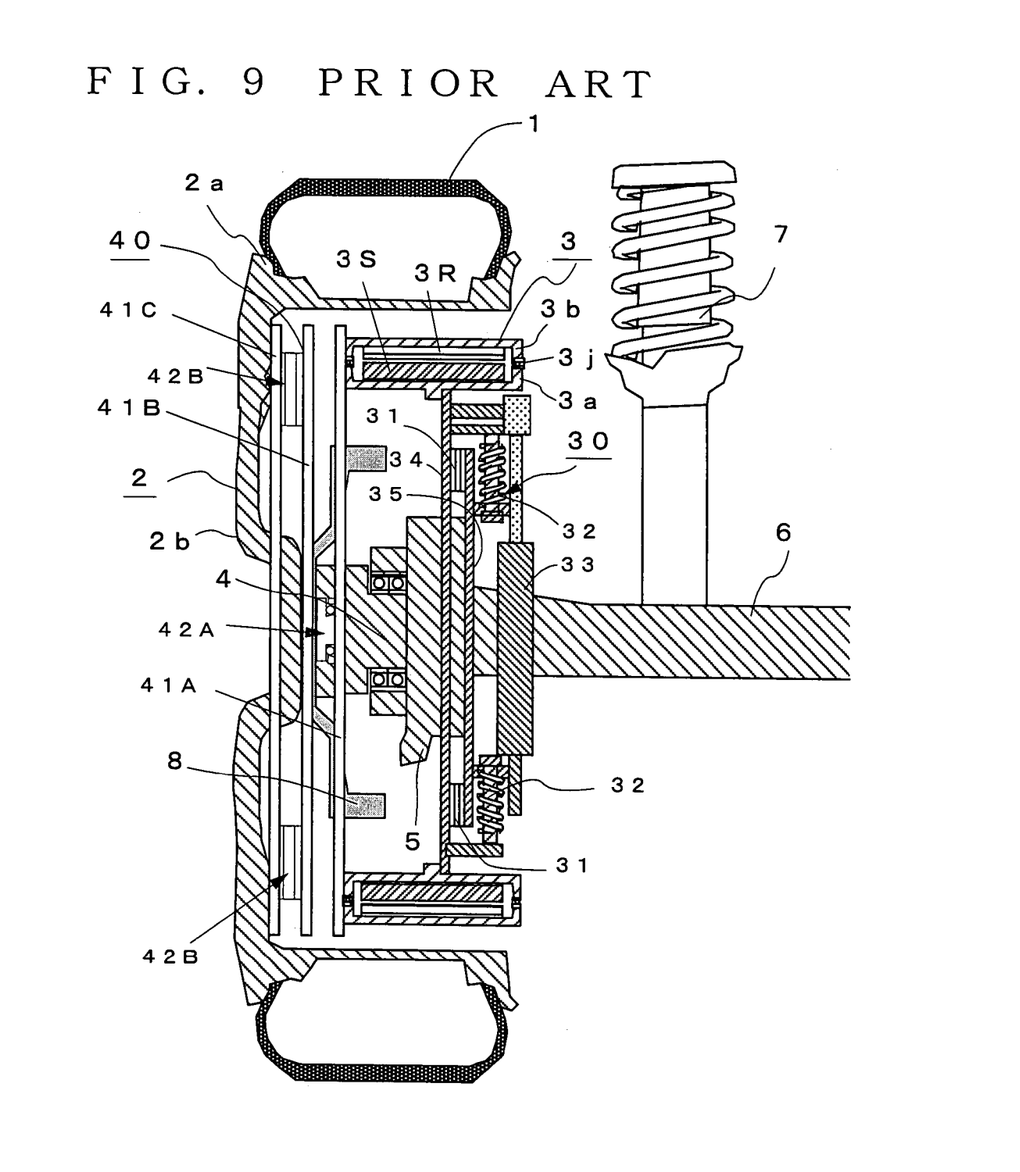
FIG. 9 is a diagram showing the constitution of an in-wheel motor system of the prior art.

As a coupling having a simple structure, there is known a Schmidt coupling 60 for interconnecting a drive shaft and a driven shaft by using a link mechanism as shown in FIG. 8 (refer to patent documents 2 and 3, for example). This Schmidt coupling 60 comprises a drive-side plate 61 which turns together with a drive shaft on the same axis as the drive shaft, a driven-side plate 62 which turns together with a driven shaft on the same axis as the driven shaft and an intermediate plate 63. The above intermediate plate 63 is connected to the above drive-side plate 61 by first links 64a and 64b on one side and to the above driven-side plate 61 by second links 65a and 65b on the other side. Thereby, eccentricity between the center of the drive-side plate 61 and the center of the driven-side plate 62 is converted into the vibratory movement of the intermediate plate 63 by the first links 64a and 64b and the second links 65a and 65b, and only torque is transmitted from the drive-side plate 61 to the driven-side plate 62, thereby making it possible to transmit torque from the drive shaft to the driven shaft without fail.

Meanwhile, in a vehicle driven by a motor, such as an electric motor, in-wheel motor systems incorporating a motor in a wheel are being employed. Out of these, there is proposed an in-wheel motor system in which the stator side of a hollow direct drive motor 3 installed in a wheel portion is supported to a part around the wheel of a vehicle by an elastic body and/or an attenuation mechanism and the motor 3 is float-mounted to the part around the wheel to make the motor 3 function as the weight of a dynamic damper (refer to patent document 4, for example). Thereby, ground contact performance and riding comfort while driving on a rough road can be both greatly improved.

Figure 10:
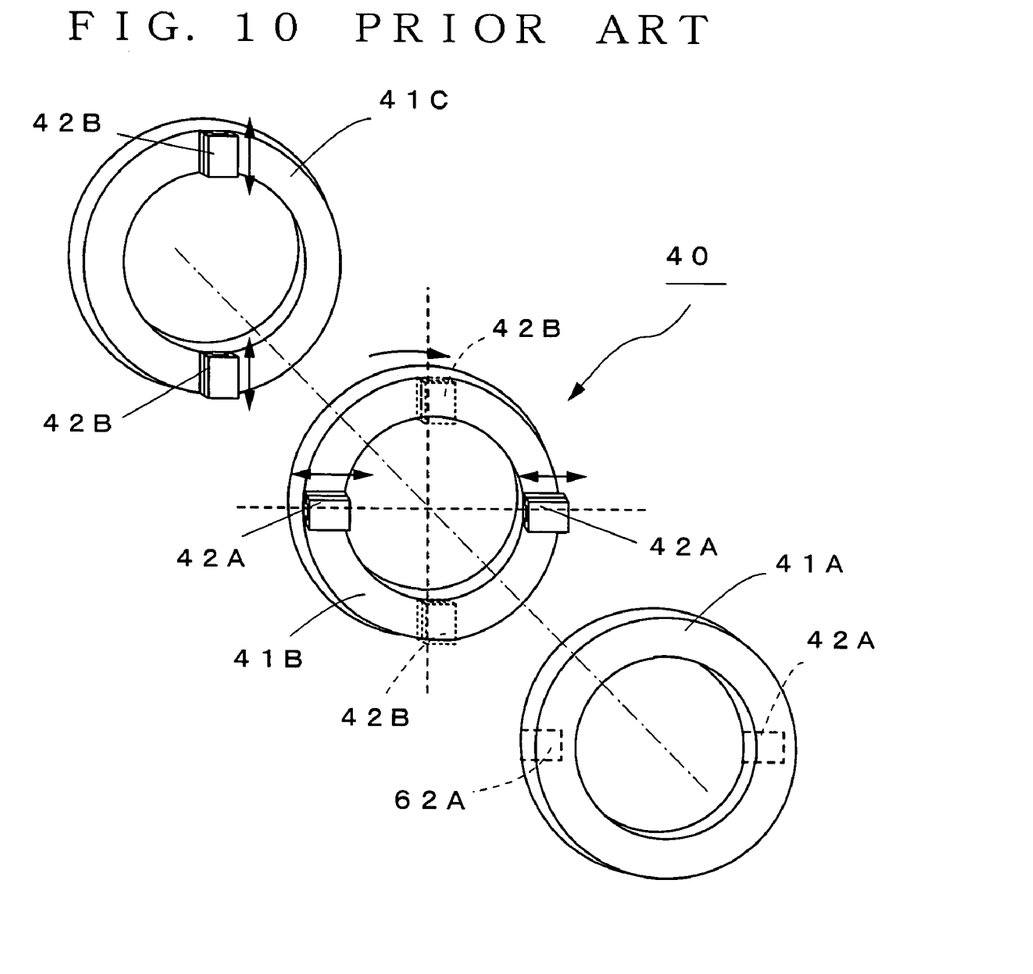
FIG. 10 is a diagram showing the constitution of a flexible coupling used in the in-wheel motor system of the prior art.

In this in-wheel motor system, stated more specifically, a non-rotating side case 3a supporting a stator 3S is elastically supported to a knuckle 5 which is a part around the wheel of a vehicle by a buffer mechanism 30 comprising two plates 34 and 35 which are interconnected by springs 32 and a damper 33 moving in the vertical direction of the vehicle and whose moving directions are limited to the vertical direction of the vehicle by direct-acting guides 31, and a rotating side case 3b supporting a rotor 3R and a wheel 2 are interconnected by a flexible coupling 40 as a drive force transmitting mechanism which can be eccentric in the radial direction from the wheel 2. The above flexible coupling 40 comprises a plurality of hollow disk-like plates 41A to 41C and direct-acting guides 42A and 42B for interconnecting adjacent plates 41A and 41B and adjacent plates 41B and 41C and guiding the adjacent plates 41A and 41B and the adjacent plates 41B and 41C in the radial direction of the disk as shown in FIG. 10. The in-wheel motor 3 can move in the moving direction of the above direct-acting guides 42A and 42B, that is, the radial direction of the disk but not in the rotational direction, thereby making it possible to transmit drive torque from the motor 3 to the wheel 2 efficiently.

Patent document 1: Japanese Laid-open Patent Application No. 9-269013

Patent document 2: Japanese Laid-open Patent Application No. 49-78050

Patent document 3: Japanese Laid-open Patent Application No. 9-267243

Patent document 4: WO 02/083446 A1

SUMMARY OF THE INVENTION

Although the above coupling 50 and the Schmidt coupling 60 are effective when the drive shaft and the driven shaft are interconnected and the drive side such as a motor is fixed on a base, it is difficult to use these couplings when not shafts but the outer sides in the radial direction of rotating bodies are interconnected and both the drive side and the driven side vibrate like the above dynamic damper type in-wheel motor system.

That is, as the above coupling 50 comprises slide members, high accuracy is required for the assembly of the coupling 50 and contact becomes strong at a movable critical point as it has no stopper function.

In the above Schmidt coupling 60, as both the first links 64a and 64b and the second links 65a and 65b move in an arcuate manner with the fixing point of the drive-side plate 61 or the driven-side plate 62 as the center thereof as shown in FIG. 8, extra torque is applied to the intermediate plate 63. Therefore, not only uniform velocity cannot be maintained in the case of eccentric movement but also a bad influence is exerted upon power transmission from the motor 3 to the wheel 2. Since the connection members have high stiffness, declination cannot be allowed.

Although the above flexible coupling 40 can transmit the drive torque of the motor 3 to the wheel 2 efficiently, it comprises direct-acting guides 42A and 42B which have a large number of parts as connection members and need high assembly accuracy, whereby it takes time to mount them to the plates 41A to 41C, thereby reducing productivity. Further, since the above direct-acting guides 4A and 42B are expensive, the apparatus becomes costly.

It is an object of the present invention which has been made in view of the problems of the prior art to provide a flexible coupling which can allow declination with a simple structure, can transmit torque on the drive side to the driven side efficiently and can be easily assembled as well as an in-wheel motor system comprising this flexible coupling.

According to a first aspect of the present invention, there is provided a flexible coupling comprising first and second connection members for interconnecting pin members provided on a drive-side plate which turns on the same axis as the drive side, a driven-side plate which turns on the same axis as the driven side and an intermediate plate interposed between the two plates, wherein the first connection members and the second connection members are arranged perpendicular to each other and composed of members including at least an elastic member to enable the distance between the pin members to be extended.

According to a second aspect of the present invention, there is provided a flexible coupling, wherein two plates are interconnected by at least a pair of connection members which are arranged at linearly symmetrical positions about the center line of the plate surface.

According to a third aspect of the present invention, there is provided a flexible coupling, wherein each of the first and second connection members comprises two pin insertion members, each having an inner cylinder into which the pin member is inserted, an outer cylinder provided outside the inner cylinder and a rubber member filled in the space between the inner cylinder and the outer cylinder, and a connection member for interconnecting the pin insertion members.

According to a fourth aspect of the present invention, there is provided a flexible coupling, wherein the connection member is composed of a steel plate.

According to a fifth aspect of the present invention, there is provided a flexible coupling, wherein the connection member is composed of a spring member.

According to a sixth aspect of the present invention, there is provided a flexible coupling, wherein the spring member is a coil spring and a storing portion projecting toward the other outer cylinder is formed in one cylinder to store the coil spring.

According to a seventh aspect of the present invention, there is provided a flexible coupling, wherein the inner cylinder and the outer cylinder are interconnected by a bearing in place of the rubber member.

According to an eighth aspect of the present invention, there is provided a flexible coupling, wherein each of the first and second connection members comprises a link rod extending in a direction for interconnecting the pin members, cylindrical holders mounted to the end portions of the link rod, and pin insertion members to be fitted in the respective cylindrical holders, each having an inner cylinder into which the pin member is inserted, an outer cylinder provided outside the inner cylinder and a rubber member filled in the space between the inner cylinder and the outer cylinder.

According to a ninth aspect of the present invention, there is provided a flexible coupling, wherein the first and second connection members are fitted onto the pin members of the two plates to be interconnected through a bearing.

According to a tenth aspect of the present invention, there is provided a flexible coupling, wherein the first and second connection members are fitted onto the pin members of the two plates to be interconnected in such a manner that the elastic member or the spring member is compressed in a direction for interconnecting the two pin members.

According to an eleventh aspect of the present invention, there is provided a flexible coupling, wherein each of the first and second connection members comprises two pin insertion members, each having a shaft projecting from a surface parallel to the plate surface in a vertical direction, an outer cylinder provided outside the shaft and a rubber member filled in the space between the shaft and the outer cylinder, and a connection member for interconnecting these pin insertion members, and the shafts are mounted to the plates in place of the pin members to interconnect the plates.

According to a twelfth aspect of the present invention, there is provided a flexible coupling, wherein the shafts are mounted to the two plates to be interconnected through a bearing.

According to a thirteenth aspect of the present invention, there is provided a flexible coupling, wherein the shafts are mounted to the two plates to be interconnected in such a manner that the rubber members are compressed in a direction for interconnecting the two shafts.

According to a fourteenth aspect of the present invention, there is provided an in-wheel motor system in which the stator side of a hollow direct drive motor installed in a wheel portion is supported to a part around the wheel of a vehicle by an elastic body and/or an attenuation mechanism, wherein a motor rotor and a wheel or a hub are interconnected by the flexible coupling.

EFFECT OF THE INVENTION

According to the present invention, in a flexible coupling comprising first and second connection members for interconnecting a drive-side plate, a driven-side plate and an intermediate plate interposed between these plates by attachment members such as pin members provided on the plates, the first connection members and the second connection members are arranged perpendicular to each other, each of the first and second connection members comprises two pin insertion members, each having an inner cylinder into which a connection pin is inserted, an outer cylinder provided outside the inner cylinder and a rubber member filled into the space between the inner cylinder and the outer cylinder, and a connection member for interconnecting these pin insertion members. Since each connection member comprises at least an elastic member so that the distance between the attachment members can be extended, even when the drive-side plate or the driven-side plate greatly vibrate, the movements of the plates are limited by the above elastic member, thereby providing a stopper function. Since the above plates move translationally, torque on the drive side can be transmitted to the driven side efficiently. Since this flexible coupling is easily assembled, it can be manufactured at a low cost.

When the above two plates are interconnected by at least a pair of connection members which are arranged at linearly symmetrical positions about the center line of the plate surface, unwanted twist can be prevented.

When the first and second connection members are to be fitted onto the attachment members of the two plates to be interconnected, they are fitted in such a manner that the above elastic members are compressed, thereby making it possible to move the flexible coupling smoothly.

The same effect can be obtained even when each of the first and second connection members comprises two pin insertion members, each having a shaft projecting in the vertical direction from the surface parallel to the plate surface, an outer cylinder provided outside the shaft and a rubber member filled in the space between the shaft and the outer cylinder, and a connection member for interconnecting these pin insertion members, and the shafts are mounted to the plates to interconnect the plates.

When this flexible coupling is used as a flexible coupling for interconnecting the motor rotor of an in-wheel motor system in which the stator side of a hollow direct motor provided in a wheel portion to a part around the wheel of a vehicle by an elastic body and/or an attenuation mechanism to a wheel or hub, the drive torque of the motor can be transmitted to the wheel without fail with simple constitution.

DESCRIPTION OF THE PREFERRED EMBODIMENTS

Preferred embodiments of the present invention will be described hereinunder with reference to the accompanying drawings.

Figure 1:
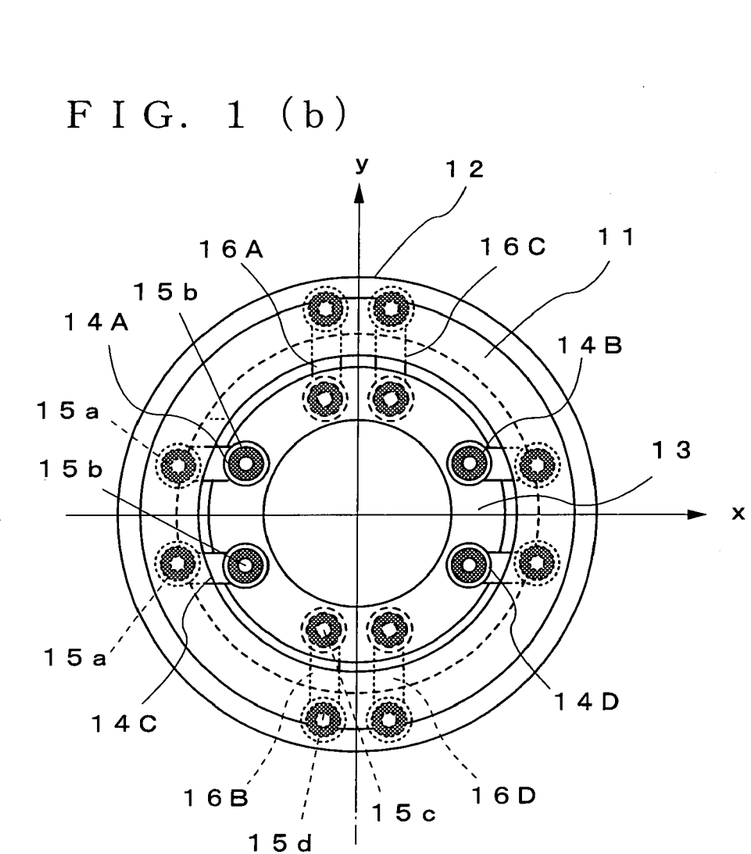
FIGS. 1(a) and 1(b) are diagrams showing the constitution of a flexible coupling according to an embodiment of the present invention.

FIGS. 1(a) and 1(b) are diagrams showing the constitution of a flexible coupling 10 according to an embodiment. Reference numeral 11 denotes a drive-side plate which turns on the same axis as a drive-side member 11J, 12 a driven-side plate which turns on the same axis as a driven-side member 12J, 13 an intermediate plate interposed between the above two plates 11 and 12, 14 (14A to 14D) first connection members for interconnecting pin members 15a and pin members 15b provided on the above drive-side plate 11 and the intermediate plate 13, respectively, and 16 (16A to 16D) second connection members for interconnecting pin members 15c and pin members 15d provided on the intermediate plate 13 and the driven-side plate 12, respectively. In this embodiment, the above four first connection members 14A to 14D are installed in such a manner that they become parallel to one another and the connection members 14A and 14B and the connection members 14C and 14D become symmetrical to each other in the vertical direction (y axis), and the second connection members 16A to 16D are installed in such a manner that they become parallel to one another in a direction perpendicular to the above first connection members 14A to 14D. The connection members 16A and 16B and the connection members 16C and 16D are symmetrical to each other in the horizontal direction (x axis).

Figure 2:
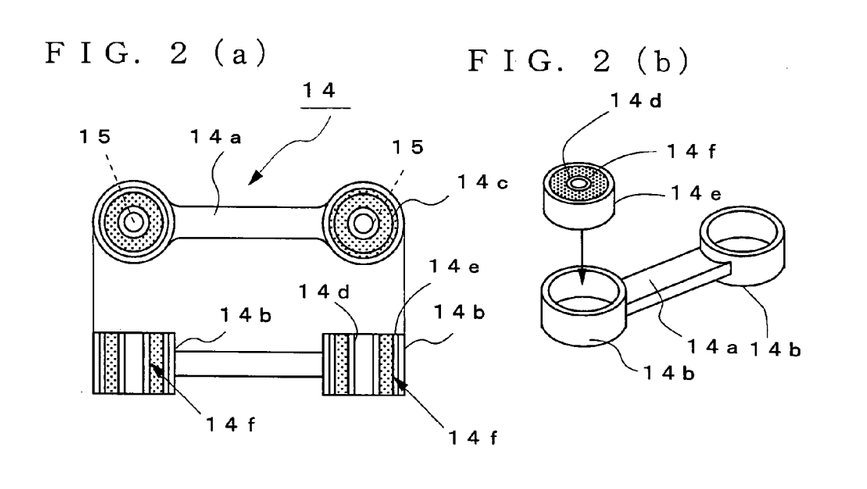
FIGS. 2(a) and 2(b) are diagrams showing an example of a connection member according to the embodiment.

FIGS. 2(a) and 2(b) are diagrams showing an example of the above first connection member 14 (14A to 14D). The first connection member 14 comprises a steel link rod 14a extending in a direction for interconnecting the pin members 15 (15a to 15d), two cylindrical holders 14b and 14b attached to both end portions of the steel link rod 14a, and pin insertion members 14c and 14c press fitted in the holders 14b and 14b and fitted onto the pin members 15. Each of the pin insertion members 14c and 14c comprises an inner cylinder 14d into which the above pin member 15 is inserted, an outer cylinder 14e provided outside the inner cylinder 14d and a rubber member 14f filled in the space between the above inner cylinder 14d and the above outer cylinder 14e. The second connection members 16 (16A to 16D) fitted onto the above pin members 15 have the same structure as the above first connection members 14.

Figure 3:
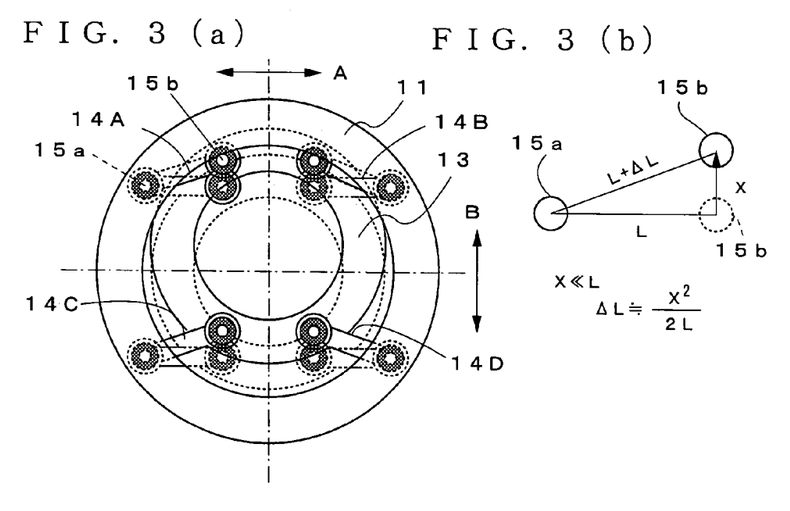
FIGS. 3(a) and 3(b) are diagrams showing the movement of the flexible coupling of the present invention.

The pin member 15a and the pin member 15b are thus interconnected by the first connection member 14 having the rubber member 14f in a direction for interconnecting the pin members 15a and 15b (direction A in FIG. 3) such that the distance between the pin member 15a and the pin member 15b can be extended. Therefore, when there is the input of power for displacing the drive-side plate 11 and the intermediate plate 13 relatively in a direction B perpendicular to the above direction A as shown in FIGS. 3(a) and 3(b), the above rubber members 14f are stretched and the distance between the pin member 15a and the pin member 15b is extended. Therefore, the above intermediate plate 13 does not turn with respect to the drive-side plate 11 by the above input of power and only moves translationally. The extension ΔL of the distance between the above pin member 15a and the pin member 15b is about 0.005 mm even when the original distance L is 10 cm and the amount X of displacement is 1 mm. Therefore, a high-hardness rubber which can transmit torque fully, has high stiffness and hardly stretches can be used as the above rubber member 14f.

When there is the input of power for displacing the intermediate plate 13 and the driven-side plate 12 in a direction perpendicular to the direction for interconnecting the pin members 15c and 15d likewise, the intermediate plate 13 does not turn with respect to the driven-side plate 12 by the above input of power and moves translationally. Since the above first and second connection members 14 and 16 do not move in the rotational direction, the drive-side plate 11 and the driven-side plate 12 can move in all directions and torque on the drive side can be transmitted to the driven side smoothly even when the drive shaft and the driven shaft become eccentric from each other.

Even when the drive-side plate 11 and the driven-side plate 12 vibrate significantly, their movements are limited by the restoring force of the above rubber members 14f, thereby exhibiting a stopper function. Therefore, the above first and second connection members 14 and 16 do not break down.

Figure 4:
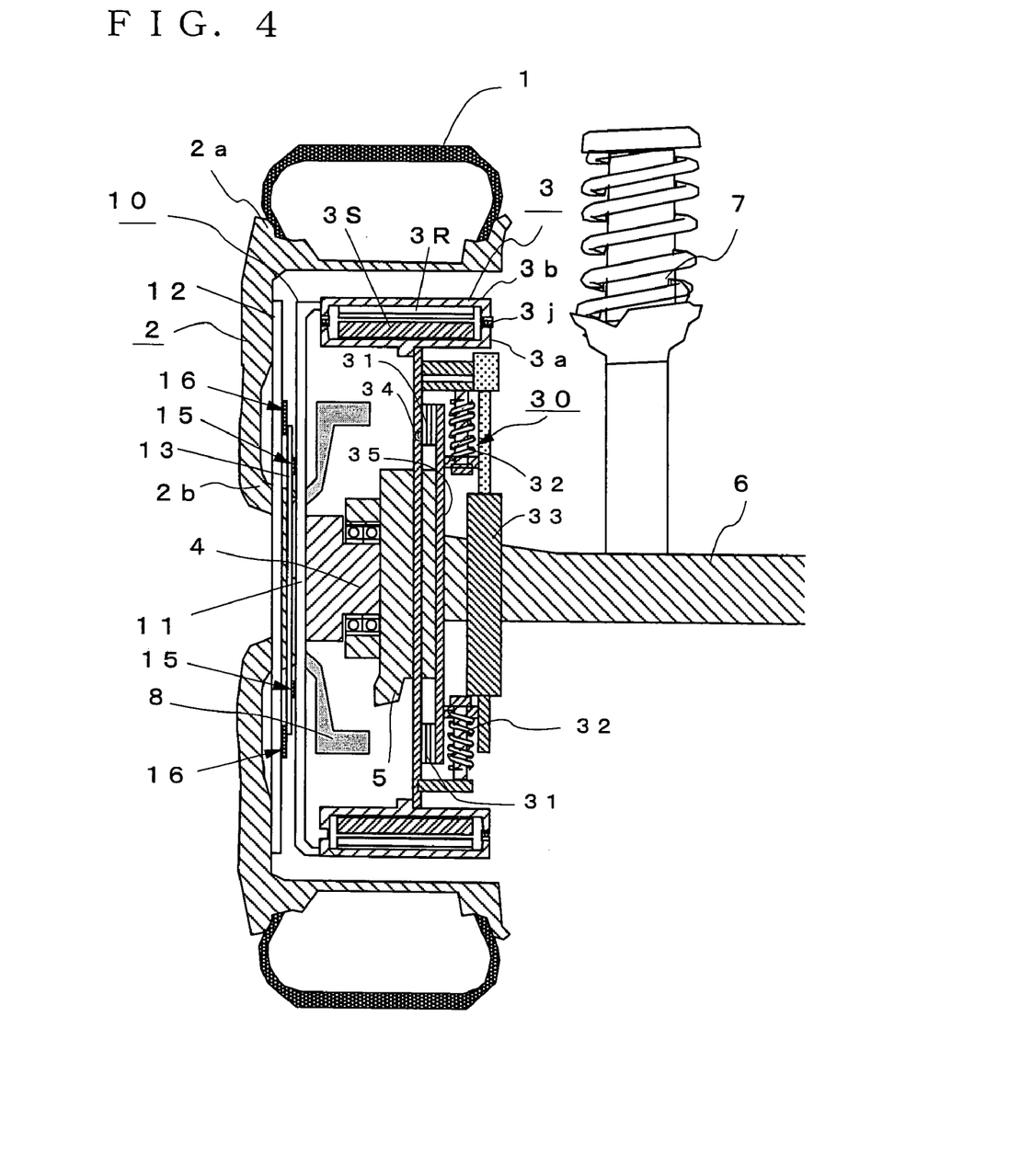
FIG. 4 is a longitudinal sectional view of an in-wheel motor system comprising the flexible coupling of the present invention.

FIG. 4 is a longitudinal sectional view showing the constitution of an in-wheel motor system comprising the flexible coupling 10 of the present invention. In FIG. 4, reference numeral 1 denotes a tire, 2 a wheel composed of a rim 2a and a wheel disk 2b, 3 an outer rotor type in-wheel motor comprising a stator 3S fixed to a non-rotating side case 3a installed on an inner side in the radial direction and a rotor 3R fixed to a rotating side case 3b rotatably connected to the above non-rotating side case 3a by a bearing 3j and installed on an outer side in the radial direction, 4 a hub portion connected to the rotary shaft of the wheel 2, 5 a knuckle connected to an axle 6, 7 a suspension member composed of a shock absorber or the like, and 8 a brake unit composed of a brake disk mounted to the above hub portion 4.

Numeral 10 denotes the flexible coupling of the present invention for connecting the rotating side case 3b to the wheel 2, and 30 a buffer mechanism for elastically supporting the non-rotating side case 3a supporting the stator 3S to the above knuckle 5 as a part around the wheel of a vehicle, comprising two plates 34 and 35 whose moving directions are limited to the vertical direction of the vehicle by direct-acting guides 31 and which are interconnected by springs 32 moving in the vertical direction of the vehicle and a damper 33.

When the above flexible coupling 10 is used in the above in-wheel motor system, four pin members projecting toward the intermediate plate 13 are provided on the drive-side plate 11 mounted to the non-rotating side case 3a of the motor, four pin members projecting toward the drive-side plate 11 are provided on the intermediate plate 13, and the first connection members 14 are fitted onto the above pin members to interconnect the drive-side plate 11 and the intermediate plate 13.

Four pin members projecting toward the driven-side plate 12 connected to the wheel 2 are provided on the rear side of the above intermediate plate 13, four pin members projecting toward the intermediate plate 13 are provided on the driven-side plate 12, and the second connection members 16 are fitted onto the above pin members. Since the drive-side plate 11 and the driven-side plate 12 are connected in such a manner that they can move freely, even when the motor shaft and the wheel shaft become eccentric from each other, the drive torque of the motor 3 can be transmitted to the wheel 2 without fail.

Since the above rubber members 14f have a slip bush function as well, rotational movement between the above connection members 14 and 16 and the pin members can be made smooth. Therefore, the movement of the flexible coupling 10 becomes smooth, thereby making it possible to improve the transmission efficiency of drive torque.

Thus, according to this embodiment, the flexible coupling 10 is constituted such that the drive-side plate 11 and the intermediate plate 13 are interconnected by the first connection members 14A to 14D having the rubber member 14f in such a manner that they can move in a direction (direction B) perpendicular to the direction for interconnecting the pin members 15a and 15b for mounting the above first connection members 14A to 14D, and the above intermediate plate 13 and the driven-side plate 12 are interconnected by the second connection members 16A to 16D arranged perpendicular to the first connection members 14A to 14D and having the same constitution as the above first connection members 14A to 14D in such a manner that they can move in a direction (direction A) perpendicular to the above direction B. Therefore, even when the drive shaft and the driven shaft become eccentric from each other, torque on the drive side can be transmitted to the driven side without fail. Since this flexible coupling 10 is simple in structure, has a small number of parts and is easily assembled, it can enhance work efficiency and improve productivity.

When this flexible coupling 10 is used in an in-wheel motor system in which the stator side of a hollow direct drive motor 3 is supported to a part around the wheel of the vehicle by the buffer mechanism 30, the assembly of the in-wheel motor system is easy, and the drive torque of the motor 3 can be transmitted to the wheel 2 without fail even when the motor shaft and the wheel shaft become eccentric from each other.

In this embodiment, the driven-side plate 12 is directly connected to the wheel 2. The same effect can be obtained even when the above driven-side plate 12 is connected to the hub portion 4 connected to the rotary shaft of the wheel 4.

Figure 5:
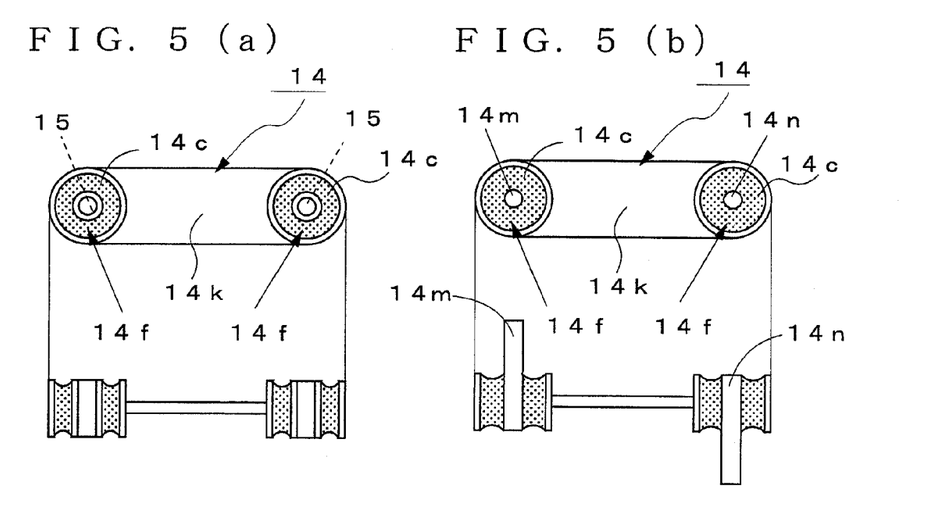
FIGS. 5(a) and 5(b) are diagrams showing other examples of the connection member of the present invention.

In the above embodiment, each of the first and second connection members 14 and 16 comprises a link rod 14a, holders 14b and pin insertion members 14c. These members may be formed integrated with one another by resin molding. Alternatively, as shown in FIG. 5(a), the holders 14b are omitted, and the outer cylinders 14e and 14e of the pin insertion members 14c may be interconnected by a steel plate 14k. As shown in FIG. 5(b), shafts 14m and 14n projecting in upper and lower directions are provided in place of the inner cylinders 14d and fixed to any one of the plates 11 to 13 in place of the above pin members 15 or rotatably connected to any one of the plates 11 to 13 by a bearing or the like.

Figure 6:
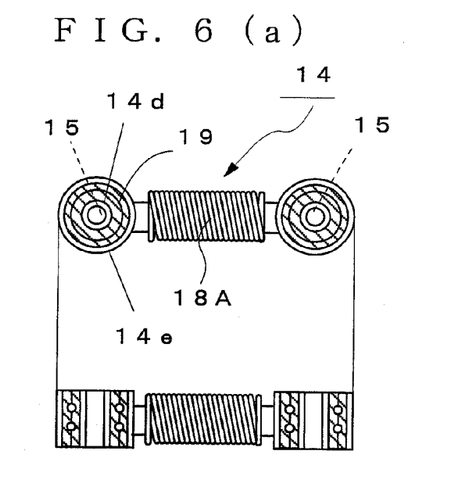
FIGS. 6(a) to 6(c) are diagrams showing still other examples of the connection member of the present invention.

Alternatively, as shown in FIGS. 6(a) to 6(c), the pin insertion members 14c may be interconnected by using a spring member such as a spring member 18A, a coil spring 18B or a flat spring 18C. When the spring member 18A, 18B or 18C is used, a bearing 19 may be used in place of the above rubber member 14f. Thereby, rotational movement between the above connection members 14 and 16 and the pin members can be made smoother and the transmission efficiency of drive torque can be improved. When the coil spring 18B is used, the diameter of one outer cylinder 14g is made large, a storing portion 14h projecting from this outer cylinder 14g toward the other outer cylinder 14e is formed, and the above coil spring 18B is stored in the above storing portion 14h.

When the above sprig member 18A, 18B or 18C is used and the above first and second connection members 14 and 16 are fitted onto the pin members 15a and 15b and the pin members 15c and 15d, the above spring member 18A, 18B or 18C is mounted such that it is compressed in a direction for interconnecting the two pin members, thereby making it possible to extend the intervals between the pin members 15a and the pin members 15b or the intervals between the pin members 15c and the pin members 15d more smoothly.

Even when the above rubber member 14f is used, the interval between the inner cylinders 14d and 14d is made slightly larger than the interval between the pin member 15a and the pin member 15b or the interval between the pin member 15c and the pin member 15d, and compressive force is applied to the sides on which the above rubber members 14f and 14f are opposed to each other.

INDUSTRIAL FEASIBILITY

As having been described above, according to the present invention, there can he provided a flexible coupling which can transmit torque on the drive side to the driven side efficiently, is inexpensive and is easily assembled.

When the flexible coupling of the present invention is used in an in-wheel motor system, an in-wheel motor which can improve both ground contact performance and riding comfort while driving on a rough road and can transmit the drive torque of the motor to the wheel without fail can be manufactured at a low cost.

What is claimed is:

1. A flexible coupling for transmitting torque of an in-wheel motor installed to a wheel portion of a wheel or a hub comprising:

a drive-side plate which is installed to the in-wheel motor, has a same axis as the in-wheel motor and turns with the in-wheel motor;

a driven-side plate which is installed to the wheel or the hub, has a same axis as the wheel or the hub and turns with the wheel or the hub;

an intermediate plate which is interposed between the drive-side plate and a driven-side plate;

a pin member which is provided on the intermediate plate side of the drive side plate;

pin members respectively provided on the drive side plate side and the driven side plate side of the intermediate plate;

a pin member provided on the intermediate plate side of the driven plate;

a first connection member which connects the pin member provided on the drive side plate and the pin member provided on a surface of the intermediate plate opposed to the drive side plate;

a second connection member which connects the pin member provided on the surface of the intermediate plate opposed to the drive side plate and the pin member provided on the driven side plate;

wherein the first connection member and the second connection member are arranged perpendicular to each other and composed of members including at least an elastic member to enable the distance between the pin members to be extended.

2. The flexible coupling according to claim 1, wherein two plates are interconnected by at least a pair of connection members which are arranged at linearly symmetrical positions about the center line of the plate surface.

3. The flexible coupling according to claim 2, wherein each of the first and second connection members comprises two pin insertion members, each having an inner cylinder into which the pin member is inserted, an outer cylinder provided outside the inner cylinder and a rubber member filled in the space between the inner cylinder and the outer cylinder, and a connection member for interconnecting the pin insertion members.

4. The flexible coupling according to claim 3, wherein the connection member is composed of a steel plate.

5. The flexible coupling according to claim 3, wherein the connection member is composed of a spring member.

6. The flexible coupling according to claim 5, wherein the spring member is a coil spring and a storing portion projecting toward the other outer cylinder is formed in one cylinder to store the coil spring.

7. The flexible coupling according to claim 5, wherein the inner cylinder and the outer cylinder are interconnected by a bearing in place of the rubber member.

8. The flexible coupling according to claim 1, wherein each of the first and second connection members comprises a link rod extending in a direction for interconnecting the pin members, cylindrical holders mounted to the end portions of the link rod, and pin insertion members to be fitted in the respective cylindrical holders, each having an inner cylinder into which the pin member is inserted, an outer cylinder provided outside the inner cylinder and a rubber member filled in the space between the inner cylinder and the outer cylinder.

9. The flexible coupling according to claim 1, wherein the first and second connection members are fitted onto the pin members of the two plates to be interconnected through a bearing.

10. The flexible coupling according to claim 1, wherein the first and second connection members are fitted onto the pin members of the two plates to be interconnected in such a manner that the elastic member is compressed in a direction for interconnecting the two pin members.

11. The flexible coupling according to claim 1, wherein each of the first and second connection members comprises two pin insertion members, each having a shaft projecting from a surface parallel to the plate surface in a vertical direction, an outer cylinder provided outside the shaft and a rubber member filled in the space between the shaft and the outer cylinder, and a connection member for interconnecting these pin insertion members, and the shafts are mounted to the plates in place of the pin members to interconnect the plates.

12. The flexible coupling according to claim 11, wherein the shafts are mounted to the two plates to be interconnected through a bearing.

13. The flexible coupling according to claim 11, wherein the shafts are mounted to the two plates to be interconnected in such a manner that the rubber members are compressed in a direction for interconnecting the two shafts.

14. An in-wheel motor system in which the stator side of a hollow direct drive motor installed in a wheel portion is supported to a part around the wheel of a vehicle by an elastic body and/or an attenuation mechanism, wherein a motor rotor and a wheel or a hub are interconnected by the flexible coupling of claim 1.

* * * * *